Jan. 11, 1938. J. W. BEAR ET AL Re. 20,615

ENVELOPE

Original Filed Feb. 18, 1933

Inventors

JOSEPH W. BEAR
AND REYBORN R. SUBLETTE

By Mason Fenwick & Lawrence
Attorneys

Reissued Jan. 11, 1938 Re. 20,615

UNITED STATES PATENT OFFICE 20,615

ENVELOPE

Joseph W. Bear, Roanoke, and Reyborn R. Sublette, Vinton, Va., assignors to Double Envelope Corporation, Roanoke, Va., a corporation of Virginia Original No. 2,001,340, dated May 14, 1935, Serial No. 657,410, February 18, 1933. Application for reissue February 11, 1937, Serial No. 125,354

2 Claims. (Cl. 229—80)

This invention relates to improvements in means for opening sealed envelopes, and more particularly, to single and double envelopes, which may be opened separately or together.

The object of this invention is to provide an envelope which may be produced inexpensively, and which may, after being sealed, be opened with ease and without danger to the contents.

Another object of the invention is to provide single or double envelopes such as those used for church collection purposes which may be easily opened, separately or together, by means of one closure flap.

A further object of the invention is to provide an envelope with a closure flap which facilitates the opening of the envelope without the use of an envelope-opener, knife or other instrument.

The above and other objects will appear in the following detailed description, taken in connection with the accompanying drawing in which.

Figure 1:
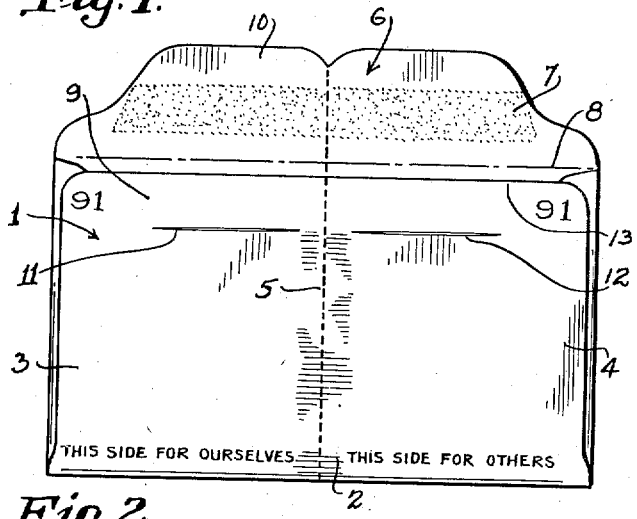
Figure 1 is a rear elevation of a double envelope embodying our invention, the back flap being shown lying in the same plane as the front of the double envelope.
Figure 4:
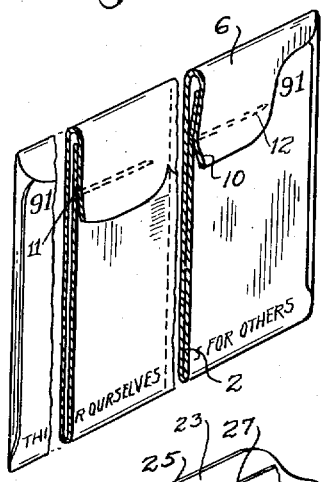
Figure 4 is a perspective view of a double envelope showing a cross section, the double flap being in sealed position.

The form of the invention shown in Figures 1 and 4 comprises a double envelope 1 pasted together internally along the narrow transverse region 2 and along the ends 3 and 4. The double envelope has a perforated or otherwise weakened line 5 through the pasted region 2, and through the flap 6 as indicated in Figure 1 and Figure 4, so that the double envelope may be torn apart readily to form separate envelopes. The flap is provided with a gummed strip 7 extending lengthwise and parallel to the fold 8, in order that the flap may be sealed to the marginal zone of the back 9. The flap 6 is provided with an ungummed outer edge 10, so that after the double envelope has been sealed, the ungummed outer edge of the flap remains free, so that it can readily be grasped in the act of opening the envelope, thus facilitating greatly the opening of the double envelope. The back 9 is provided with slits 11 and 12, positioned parallel to the outer edge 13 and at one side of the marginal zone.

The slits 11 and 12 partially sever the marginal zone 9 from the back of the envelope and when the flap is sealed the gummed strip 7 adheres to the marginal zone so that when the free edge 10 is grasped by the fingers and the flap snapped open, the marginal zone 9, being in adherence to the gummed strip, is readily torn off from the back of the envelope.

Figure 2:
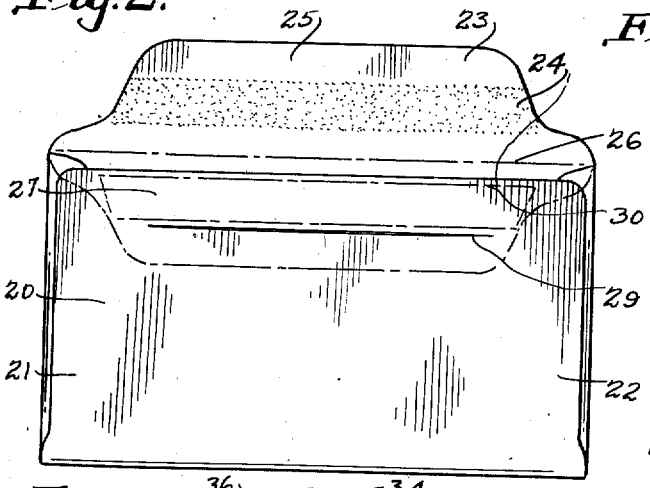
Figure 2 is a rear elevation of a single envelope embodying our invention, the back flap being shown lying in open position.

Figure 2 illustrates a single envelope 20 pasted together internally along the ends 21 and 22, and provided with a flap 23 substantially similar to the flap described in the preceding description, which flap 23 has a gummed strip 24, which when the flap is sealed adheres to the marginal zone 27 between the slit 29 and the outer edge 30. The flap 23 has a free outer edge so that when the gummed strip 24 is in adherence with the marginal zone 27, the free outer edge may be easily grasped by the fingers and the flap snapped open, the marginal zone 27 remaining in adherence to the gummed strip 24 and being torn from the back of the envelope.

Figure 3:
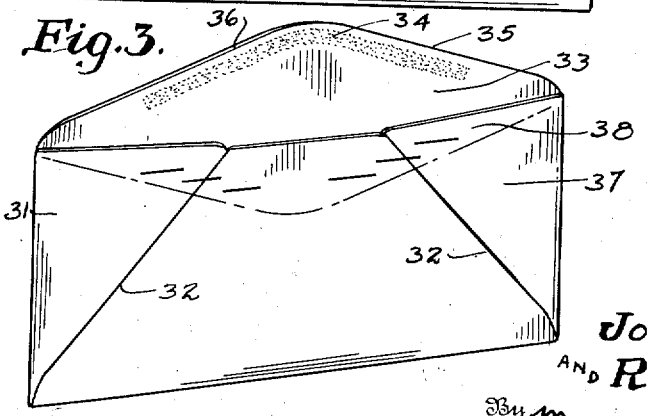
Figure 3 is a rear elevation of a modified form of a single envelope embodying our invention, the back flap being shown open.

Another modification of the invention comprises an envelope 31 as shown in Figure 3, pasted together internally along the transverse regions 32, and having an angular shaped sealing flap 33 provided with a gummed strip 34 extending parallel to the edge 35. The flap 33 has an ungummed outer edge 36 so that after the envelope has been sealed the ungummed outer edge of the flap remains free.

The upper margin of the back 37 is provided with a series of slits 38, preferably parallel to each other and spaced so as to lie beneath the gummed strip 34 when the latter is adhered to the back 37. The series of slits 38 minimizes the resistance offered by the portion of the back in adherence to the gummed strip, so that it tears away with the gummed strip when the flap is pulled open by means of the free edge 36.

It will be noted from Figure 1 that both sections of the double envelope may be opened simultaneously or that either one of the sections may be opened separately at different times, and that the line of perforations also permits the two sections to be separated entirely, the pasted transverse region 2 constituting a completely sealed envelope. These features greatly add to the value of the invention for increasing the efficiency of church collection work and the like, by furnishing a single or double envelope which may be easily and quickly opened without injury to the contents.

Figure 5:
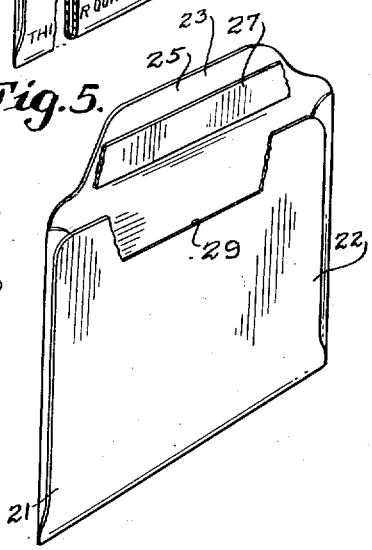
Figure 5 is a rear elevation of a single envelope embodying our invention, the back flap being shown lying in the same plane as the front of the envelope after the flap has been snapped up, tearing away with it part of the back of the envelope.

It will be noted further, and particularly as shown in Figure 5, that when the flap is snapped open, the portion of the back which was partially severed by the slits and to which the gummed strip was in adherence when the flap was sealed, has been torn away from the back and remains adhered to the gummed strip, thereby enlarging the opening and aiding in the extracting or discharging of the contents of the envelope.

As shown in Figure 1 the adjacent ends of the aligned slits 11 and 12, extend clear to the opposite edges of the transverse pasted strip 2; and, in the opposite directions, terminate at appreciable distances from the opposite side edges of the envelope. The gummed strip or band 7 is continuous from one edge to the other of the flap 6; and is longer than the combined lengths of the slits 11 and 12 and the width of the transverse pasted strip between the adjacent ends of said slits.

Obviously when the flap 6 is folded over the back of the envelope and is sealed thereto, the gummed band adheres to the back along that part covering the transverse strip 2 between the adjacent ends of the slits 11 and 12. The outer ends of the gummed band also adhere to those parts of the back lying between the opposite ends of the slits 11 and 12 and the outer side edges of the envelope. This means that when the sealed duplex envelope is torn in half along the weakened line 5, the flaps of both half-envelopes are completely sealed to their respective backs above and throughout the lengths of the respective slits 11 and 12; and are also sealed to the solid parts of each half-envelope at the outer end of each slit. The adhesion of the gummed band of the flap to the solid parts of the back between the adjacent ends, and at opposite ends, of each slit, materially strengthens the connection between the flap and back of each half-envelope; and provides a seal which is practically impossible to break accidentally. In other words, each half-envelope, like the envelope illustrated in Figure 2, is completely sealed to the back above and throughout the length of the slit therein, as well as to the solid parts of the back at the opposite ends of the slit.

What we claim is:

1. A duplex envelope comprising a body having front and back faces closed at the sides and bottom and having an opening at the top, the front face having a flap foldable over said opening, said front and back faces being pasted together along a transverse strip forming side-by-side pockets, said flap and the body of the envelope having a transverse line of weakness extending intermediately along the said pasted strip, the back of said envelope having straight line slits extending from the opposite edges of said transverse strip and substantially parallel to the edge of said opening, each slit being substantially longer than one-half of the width of the side pocket over which it extends, said flap having a gummed area in the form of a continuous gummed band spaced from and extending substantially parallel to the free edge of said flap, said band being symmetrical with respect to the transverse line and being at least equal in length to the combined lengths of said slits and the space on the back between the adjacent ends of said slits, the band being located when in sealing position to make adhesive contact with the back of said envelope above and throughout the lengths of said slits and with the solid part of said back between adjacent ends of said slits, the free part of said flap between the gummed area and the free edge overlying said slits when the envelope is sealed.

2. A duplex envelope comprising a body having front and back faces closed at the sides and bottom and having an opening at the top, the front face having a flap foldable over said opening, said front and back faces being pasted together along a transverse strip forming side-by-side pockets, said flap and the body of the envelope having a transverse line of weakness extending intermediately along the said pasted strip, the back of said envelope having straight line slits extending from the opposite edges of said transverse strip and substantially parallel to the edge of said opening, each slit being substantially longer than one-half of the width of the side pocket over which it extends, said flap having a gummed area in the form of a continuous gummed band spaced from and extending substantially parallel to the free edge of said flap, said band being symmetrical with respect to the transverse line and of greater length than the combined length of said slits and the space on the back between the adjacent ends of said slits, the band being located when in sealing position to make adhesive contact with the back of said envelope above and throughout the lengths of said slits and with the solid part of said back between adjacent ends of said slits, and with solid parts between the outer ends of said slits and the side edges of the envelope, the free part of said flap between the gummed area and the free edge overlying said slits when the envelope is sealed.

JOSEPH W. BEAR.
REYBORN R. SUBLETTE.